United States Patent [19]
Corneau, Jr.

[11] Patent Number: 5,366,684
[45] Date of Patent: Nov. 22, 1994

[54] MOLDING COMPOSITE METHOD USING AN INFLATABLE BLADDER PRESSURIZED IN AN AUTOCLAVE

[75] Inventor: Louis P. Corneau, Jr., Kings Park, N.Y.

[73] Assignee: Grumman Aerospace Corporation, Bethpage, N.Y.

[21] Appl. No.: 999,131

[22] Filed: Dec. 31, 1992

[51] Int. Cl.⁵ .................. B29C 67/14; B29C 43/10
[52] U.S. Cl. ........................ 264/510; 156/285; 156/382; 264/258; 264/314; 425/389
[58] Field of Search ............ 264/257, 258, 314, 316, 264/511, 571, 510; 156/156, 285, 382; 425/389, 405.1, 417

[56] References Cited

U.S. PATENT DOCUMENTS

| | | | |
|---|---|---|---|
| 2,739,350 | 3/1956 | Lampman | 156/156 |
| 4,062,917 | 12/1977 | Hill et al. | 425/405.1 |
| 4,475,976 | 10/1984 | Mittlestadt et al. | 425/389 |
| 5,013,514 | 5/1991 | Azzani et al. | 264/314 |

Primary Examiner—Jay H. Woo
Assistant Examiner—Robert B. Davis
Attorney, Agent, or Firm—Pollock, Vande Sande & Priddy

[57] ABSTRACT

A first surface of a prepreg laminate is positioned against a female mold surface. An inflatable bladder is positioned against an opposite surface. A vacuum bag encloses the mold laminate and bag and they are placed in an autoclave. The bladder is inflated to cause the laminate to conform closely to the female mold surface.

2 Claims, 2 Drawing Sheets

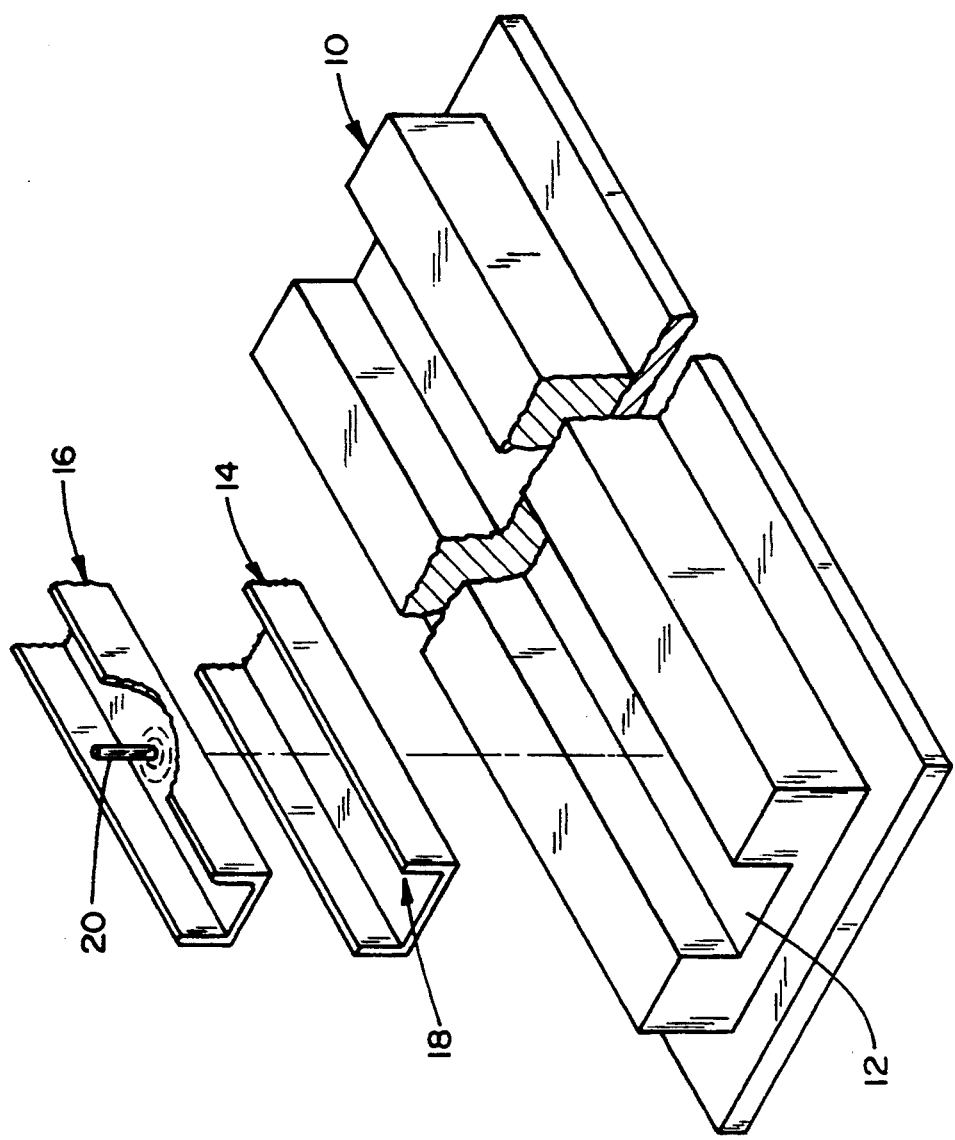
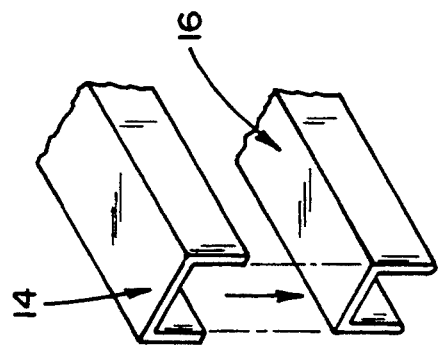

MOLDING COMPOSITE METHOD USING AN INFLATABLE BLADDER PRESSURIZED IN AN AUTOCLAVE

FIELD OF THE INVENTION

The present invention relates to molding apparatus, and more particularly to high precision molding apparatus for composite laminates.

BACKGROUND OF THE INVENTION

Prepreg composites, such as graphite-epoxy have been molded into all sorts of lightweight structures, particularly in the aircraft industry. Typically, a number of plies are laid up into a female mold. However, application by this technique inherently produces composite parts with an oversized thickness in the female radii. Caul plates and even match metal tooling do not alleviate the problem.

Because of the variation of thickness of each ply tolerance, the male radii on the caul plate for matched metal tooling can give an outof-tolerance female radius. Accordingly, it is difficult to obtain high precision molding with composites.

The present invention utilizes an inflatable stiffened bladder which dimensionally matches the inside mold line. The bladder basically includes a resilient surface which presses a laid-up composite securely within a female mold form. A stiffened section of the bladder accommodates vacuum compaction.

Prior to insertion within the female mold, the individual plies of the composite are laid up onto an inverted bladder which serves as a male mold. These plies are periodically compacted before inversion and insertion into the female mold. As a consequence, the plies are maintained tightly against the male radius of the stiffened bladder; and any deviation of ply thickness is taken up by the inflatable bladder when it is inflated.

Inflation of the bladder occurs when a vent tube is subjected to autoclave pressure. Thus, the composite being molded can be cured in an autoclave while the bladder maintains its inflated state. This ensures, during the curing-molding interval, that the outer surfaces of the composite will be forced against the respective molding surfaces of the female mold and the contacting bladder. As a result, composites may be fabricated to exact replication of the molding surfaces

BRIEF DESCRIPTION OF THE PRESENT INVENTION

BRIEF DESCRIPTION OF THE FIGURES

The above-mentioned objects and advantages of the present invention will be more clearly understood when considered in conjunction with the accompanying drawings, in which:

FIG. 1 is a perspective exploded view of the present invention in conjunction with a composite laminate and a mold form:

FIG. 2 illustrates the relationship of laminate plies as they are laid up on a stiffened bladder;

DETAILED DESCRIPTION OF THE INVENTION

Figure 3:
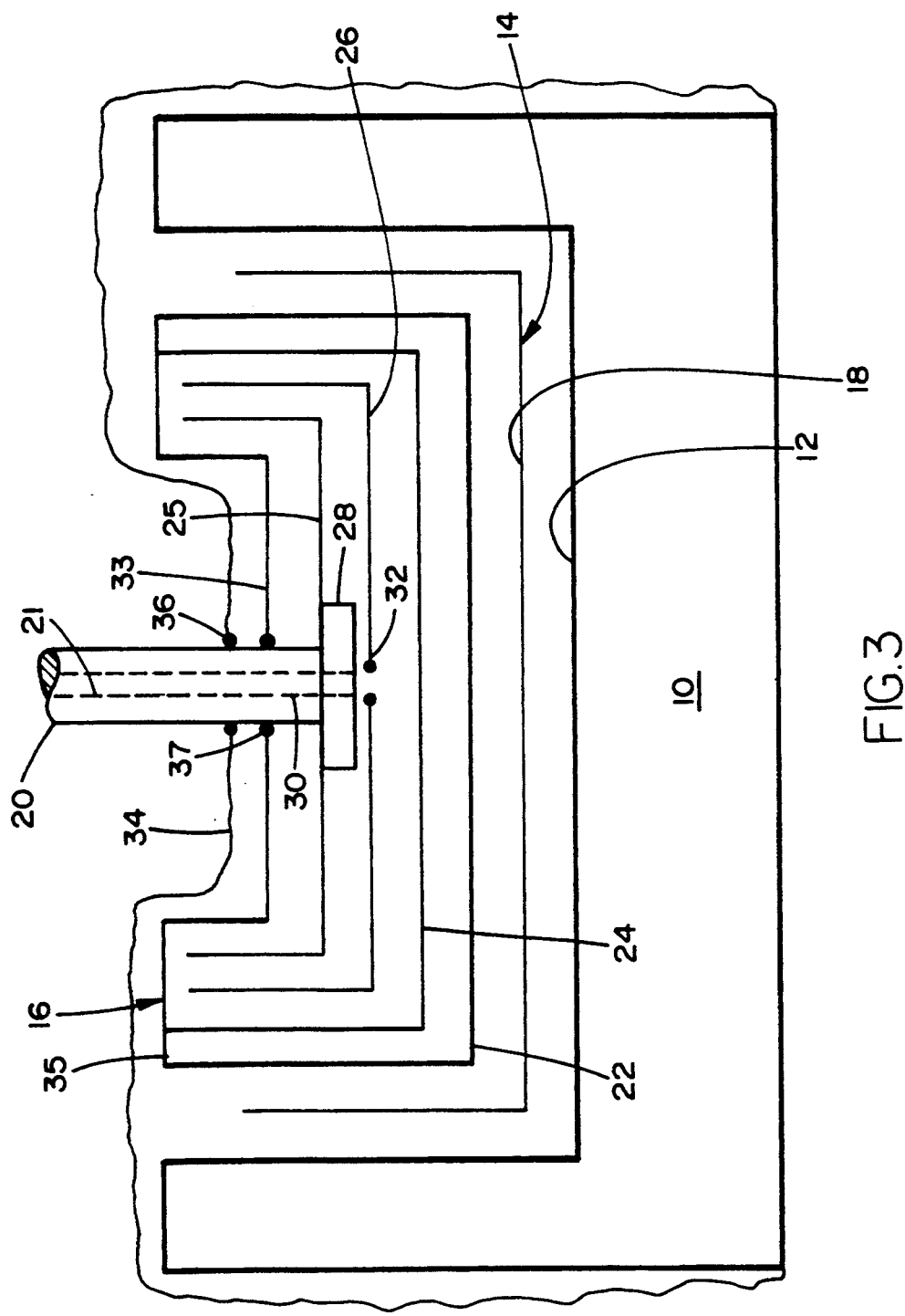
FIG. 3 is a diagrammatic illustration of the present invention during a molding process.

FIG. 1 illustrates the basic components of the present invention. Reference numeral 10 generally indicates a female metal mold form having a typical U-shaped recess 12 to which multiple plies of a composite laminate 14 will comply. Typically, the laminate comprises 10-15 plies of prepreg graphite-epoxy. The bottom surface of the laminate 14 will be made to conform to the U-shaped recess 12 of the mold form 10 so as to form an elongated channel, as generally indicated by reference numeral 18. It is to be stressed, however, that the elongated channel shape is chosen for explanation purposes and should not be construed as a limitation of the invention.

The plies of the laminate are forced against the recess 12 of the mold by an inflatable stiffened bladder 16 which becomes inflated through a tube 20. In the setup of FIG. 1, it is intended for the prepreg composite material of laminate 14 to be cured and molded in an autoclave as the tube 20 is subjected to autoclave pressure. By surrounding the stiffened bladder 16 in a sealing vacuum bag 34, as shown in FIG. 3, a pressure differential will result which inflates the bladder 16.

FIG. 2 illustrates a preliminary lay-up procedure. Individual plies of composite prepreg are laid up on an inverted stiffened bladder 16. Accordingly, during this preliminary step, the stiffened bladder 16 serves as a male mold for the laminate 14. After the requisite number of composite plies, typically 10215 are applied, the laid-up laminate and the stiffened bladder 16 are inverted, as shown on FIG. 1. The bladder and laminate plies are pushed into recess 12 of the mold form 10. Then, the composite material is cured in an autoclave, the autoclave pressure being applied to the interior of the bladder through tube 20 during the curing-molding interval.

FIG. 3 illustrates a more detailed schematic cross section of the deployed stiffened bladder 16, relative to the laminate and mold form. Generally describing the layers from bottom to top, the laminate 14 rests against the recess 12 of the mold form 10. The basic stiffened bladder 16 includes a resilient rubber layer 24 which is preferably fabricated from a commercially available material known as Air Pad, manufactured by the Air Tech Corporation of California. To the outer surface of the rubber layer is bonded a layer 22 of TEFLON or equivalent material. This prevents sticking between the prepreg laminate 14 and the rubber layer 24. The bladder 16 is given its stiffness by the inclusion of a stiffener layer 25 in spaced relationship to the rubber layer 24, the stiffener layer may be made from a composite material such as graphite-epoxy. An internal separator sheet 26, made of TEFLON or the like, is positioned between the stiffener layer 25 and the rubber layer 24 to prevent sticking between the stiffener layer and the rubber layer 24. The bladder layers become completed with the inclusion of an additional outer rubber layer 33, similar in composition to that of layer 24. The rubber layer actually extends over the edge of the bladder, as indicated by reference numeral 35 to complete a leak-proof, inflatable member.

In order to inflate the bladder 16, the tube 20 extends inwardly through the rubber layer 33 and stiffener layer 25. An annular head 28 is attached to the inner end of the tube 20 to prevent its withdrawal. A central passage 21 exists within the tube 20 and the head 28 to allow the passage of air therethrough. The head 28 also creates a space for encouraging inflation of bladder 16 when in a collapsed condition. In order to allow unencumbered passage of inflating air into the interior of the bladder 16, the TEFLON sheet 26 includes an opening 32 therein which is coaxial with the central passage 21. An alternate arrangement in the vicinity of head 28 would have been the optional mounting (not shown) of an annular TEFLON disc onto the outer end of the head 28. It should be re-emphasized at this point that, although TEFLON is set forth as a preferred trademarked material, equivalent materials might be used as well.

When the laminate 14 is ready for molded curing, a vacuum bag 34 is installed around the bladder and the outside of the mold form 10, as shown in FIG. 3. The vacuum bag is evacuated so as to reduce pressure against the outside of the bladder as much as possible. When in the autoclave during curing, a tube 20 allows inflation of the bladder since the bladder is sealed to the tube 20, as indicated at reference numeral 37. Although not shown, a check valve may be included in, or attached to head 28.

The end result of the inflation and autoclave curing will be a nearperfectly replicated part with tolerances approaching injection molding.

It should be understood that the invention is not limited to the exact details of construction shown and described herein for obvious modifications will occur to persons skilled in the art.

I claim:

1. A molding method for fabricating laminates comprising the steps:

laying up a plurality of layers of flexible material on a stiffened bladder;

inverting the laid-up material and contacting bladder;

inserting the bladder and laid-up material into a female mold form wherein an exposed surface of the material directly contacts a recess of the mold;

positioning the assembly of mold, material, and bladder in an autoclave;

enclosing the bladder within a bag while maintaining exposure of an inflation tube;

evacuating the bag so as to allow full differential pressure to develop within the bag during inflation;

inflating the bladder to force increased conformance of the exposed surface of the material to edges of the mold recess; and bonding the layers to form a laminate as the bladder remains inflated.

2. The method set forth in claim 1 wherein the material includes a plurality of plies of prepreg composite.

* * * * *